(12) United States Patent
Rotem

(10) Patent No.: US 7,656,635 B2
(45) Date of Patent: Feb. 2, 2010

(54) OVERHEAT DETECTION IN THERMALLY CONTROLLED DEVICES

(75) Inventor: Efraim Rotem, Haifa (IL)

(73) Assignee: Intel Corporation, Santa Clara, CA (US)

( * ) Notice: Subject to any disclaimer, the term of this patent is extended or adjusted under 35 U.S.C. 154(b) by 97 days.

(21) Appl. No.: 10/912,977

(22) Filed: Aug. 6, 2004

(65) Prior Publication Data

US 2006/0034343 A1 Feb. 16, 2006

(51) Int. Cl.
*H02H 5/04* (2006.01)
*G01K 1/08* (2006.01)

(52) U.S. Cl. .................................. 361/103; 702/132
(58) Field of Classification Search ............... 361/103; 702/132
See application file for complete search history.

(56) References Cited

U.S. PATENT DOCUMENTS

| | | | | |
|---|---|---|---|---|
| 4,567,466 | A * | 1/1986 | Bozarth et al. | 341/139 |
| 5,422,806 | A * | 6/1995 | Chen et al. | 700/29 |
| 5,550,702 | A * | 8/1996 | Schmidt et al. | 361/103 |
| 6,098,030 | A * | 8/2000 | McMinn | 702/132 |
| 6,774,653 | B2 * | 8/2004 | Gold et al. | 324/760 |
| 6,975,047 | B2 * | 12/2005 | Pippin | 307/117 |
| 6,996,491 | B2 * | 2/2006 | Gold et al. | 702/132 |
| 7,096,145 | B2 * | 8/2006 | Orenstien et al. | 702/132 |
| 7,141,953 | B2 | 11/2006 | Cohen | |
| 7,185,500 | B2 * | 3/2007 | Meir | 62/3.2 |
| 7,275,012 | B2 * | 9/2007 | Hermerding, II | 702/136 |
| 2002/0101715 | A1 * | 8/2002 | Osecky et al. | 361/687 |
| 2003/0158697 | A1 | 8/2003 | Gold et al. | |
| 2004/0047099 | A1 | 3/2004 | Pippin | |

FOREIGN PATENT DOCUMENTS

DE 10062441 3/2002

OTHER PUBLICATIONS

Kevin Skadron, et al., "Temperature-Aware Microarchitecture," Published in the Proceedings of the 30th International Symposium on Computer Architecture, Jun. 9-11, 2003 in San Diego, CA, pp. 1-12.

(Continued)

*Primary Examiner*—Fritz M. Fleming
*Assistant Examiner*—Lucy Thomas
(74) *Attorney, Agent, or Firm*—Kacvinsky LLC

(57) ABSTRACT

Systems and methods of overheat detection provide for generating a control signal on a die containing a processor based on an internal temperature of the processor and a control temperature threshold. It can be determined whether to generate a warning temperature event on the die based on a behavior of the control signal. In one embodiment, the warning temperature event provides for initiation of an automated data saving process, which reduces the abruptness of conventional warning temperature shutdowns. Other embodiments provide the user the option of saving his or her work before a shutdown temperature threshold is reached.

29 Claims, 6 Drawing Sheets

OTHER PUBLICATIONS

Kevin Skadron, et al., "Control-Theoretic Techniques and Thermal-RC Modeling for Accurate and Localized Dynamic Thermal Management," Published in the Proceedings of the Eighth International Symposium on High-Performance Computer Architecture, Feb. 2-6, 2002 in Cambridge, MA, pp. 1-12.

Intel SpeedStep® Technology Backgrounder, Mobile Pentium®/// Processors Featuring Intel® Speedstep™ Technology-Desktop-Class Performance and Low Power for Longer Battery Life, pp. 1-3. http://www.intel.com/mobile/resources/downloads/pdf/Intel_Speedstep.pdf, downloaded on website Oct. 26, 2004.

Cohen, et al., entitled, "Methods and Apparatus for Optimal Voltage and Frequency Control of Thermally Limited Systems", U.S. Appl. No. 11/459,407, filed Jul. 24, 2006.

* cited by examiner

OVERHEAT DETECTION IN THERMALLY CONTROLLED DEVICES

BACKGROUND

1. Technical Field

One or more embodiments of the present invention generally relate to temperature control. In particular, certain embodiments relate to overheat detection in thermally controlled devices.

2. Discussion

The popularity of computing systems continues to grow and the demand for mobile computing systems such as notebook personal computers (PCs), personal digital assistants (PDAs) and wireless "smart" phones, in particular, has experienced historical escalations. While the trend toward smaller computers and faster processing speeds has been desirable to consumers, it presents a number challenges to computer designers as well as manufacturers. A particular area of concern relates to overheating.

It is well documented that a computer processor running at a higher speed tends to consume more power and generate more heat than a similarly situated processor running at a lower speed. The increase in temperature can negatively impact the performance of the processor as well as the performance of nearby components. For example, device speed and long term reliability can deteriorate as temperature increases. If temperatures reach critically high levels, the heat can cause malfunction, degradation in lifetime or even permanent damage to the part.

Modern approaches to on-die overheat detection in computer processors involve the establishment of a temperature "guard band" defined by a lower temperature threshold and an upper temperature threshold. An internal temperature of the processor is monitored and when the internal temperature crosses the lower threshold of the guard band, thermal management techniques such as clock throttling or voltage/frequency scaling are activated. FIG. 1A shows a thermal management plot 10 in which a guard band is defined by a lower control temperature threshold 12 and an upper shutdown temperature threshold 14. When the internal temperature curve 16 reaches the lower threshold 12, thermal management is activated, which if successful, brings the average temperature 18 down over time. FIG. 1B, on the other hand, shows a plot 21 having an internal temperature curve 20 in which thermal management is unsuccessful and the average temperature 22 increases over time. In such a case, the upper threshold 14 of the guard band is used to signal a system shutdown in order to prevent catastrophic failure. While such an approach has been acceptable under certain circumstances, there remains considerable room for improvement.

For example, conventional overheat detection approaches depend upon system shutdowns associated with the upper threshold 14 as the sole mechanism for protecting against unsuccessful thermal management. As a result, system shutdowns due to overheating can appear to the user as being rather abrupt. For example, in some cases, data is lost due to a lack of advance notice of the impending shutdown. Furthermore, it is common to design the guard band to be fairly large in order to afford the thermal management techniques sufficient time to bring the average temperature down before a system shutdown occurs. The larger guard band essentially results in a smaller thermal envelope and allows for less processing resources because a higher performing processor cannot be used.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1A:
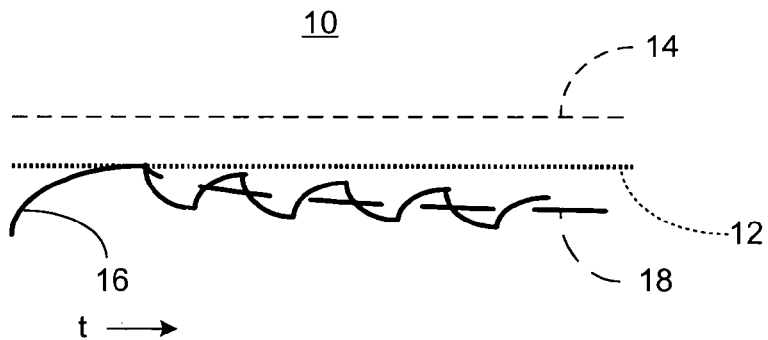
FIG. 1A is a plot of an example of successful thermal management.
Figure 1B:
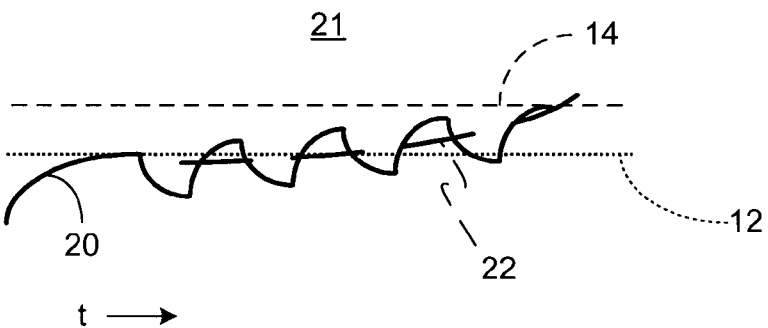
FIG. 1B is a plot of an example of unsuccessful thermal management.
Figure 2:
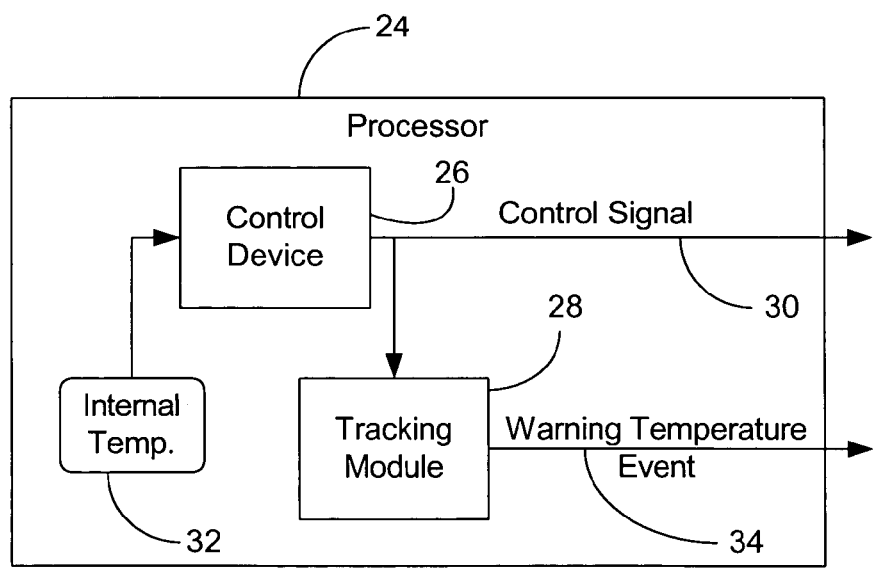
FIG. 2 is a block diagram of an example of a processor thermal management system according to one embodiment of the invention.

FIG. 2 shows a processor 24 having a substantially improved architecture over conventional processors. The processor 24 implements an "on-die" thermal protection scheme in which internal temperature measurements such as temperature measurement 32 are made. In one embodiment, the temperature measurement 32 is a continuous signal taken from a thermal diode. The processor 24 could be similar to an Intel® Pentium®-M processor, available from Intel® Corporation, Santa Clara, Calif., and may be part of a mobile computing system such as a notebook personal computer (PC), a personal digital assistant (PDA), wireless "smart" phone, and so on. While certain examples will be described with regard to mobile computing systems, the embodiments of the invention are not so limited. Indeed, any computing system in which overheating is an issue of concern can benefit from the principles described herein. Notwithstanding, there are a number of aspects of mobile computing systems for which the embodiments are well suited.

The illustrated processor 24 has a control device 26 that generates a control signal 30 based on the internal temperature measurement 32 and a control temperature threshold. The control temperature threshold could represent the lower boundary of a temperature guard band in which the upper boundary is a shutdown temperature threshold and thermal management takes place when the internal temperature measurement 32 falls between the two boundaries. The processor 24 also has a tracking module 28, which is able to determine whether to generate a warning temperature event 34 based on a behavior of the control signal 30. As will be discussed in greater detail below, generating the warning temperature event 34 could involve initiation of an automated data saving process in which unsaved work can be protected should a system/processor shutdown occur. In another example, the warning temperature event 34 could include a user notification, where the user notification recommends that the user initiate a manual data saving process. Generation of the warning temperature event 34 could also include initiating a process such as an operating system (OS) procedure, a system management software routine or a platform control function. The OS procedure could place the system in a low power mode such as a sleep or hibernate mode. The system management routine may be part of the basic input/output system (BIOS) and the platform control function may be managed by an embedded controller or a chipset. Thus, the temperature tracking could be on die, where the shutdown functionality is external to the die.

Generating the warning temperature event 34 based on the control signal 30 rather than the internal temperature measurement 32 enables the processor 24 to be much more responsive to unsuccessful thermal management techniques. For example, an undesirable trend in the control signal 30 could indicate failed thermal management long before the shutdown temperature threshold is reached. As a result, certain protective measures (e.g., data saving) can be taken in anticipation of a possible shutdown, making the shutdown process much less abrupt. The advance notice also enables the control temperature threshold to be set at a much higher value without concern over "runaway" throttling. The higher control temperature threshold provides for a smaller guard band, larger thermal envelope and a greater processor performance for a given box.

Figure 3:
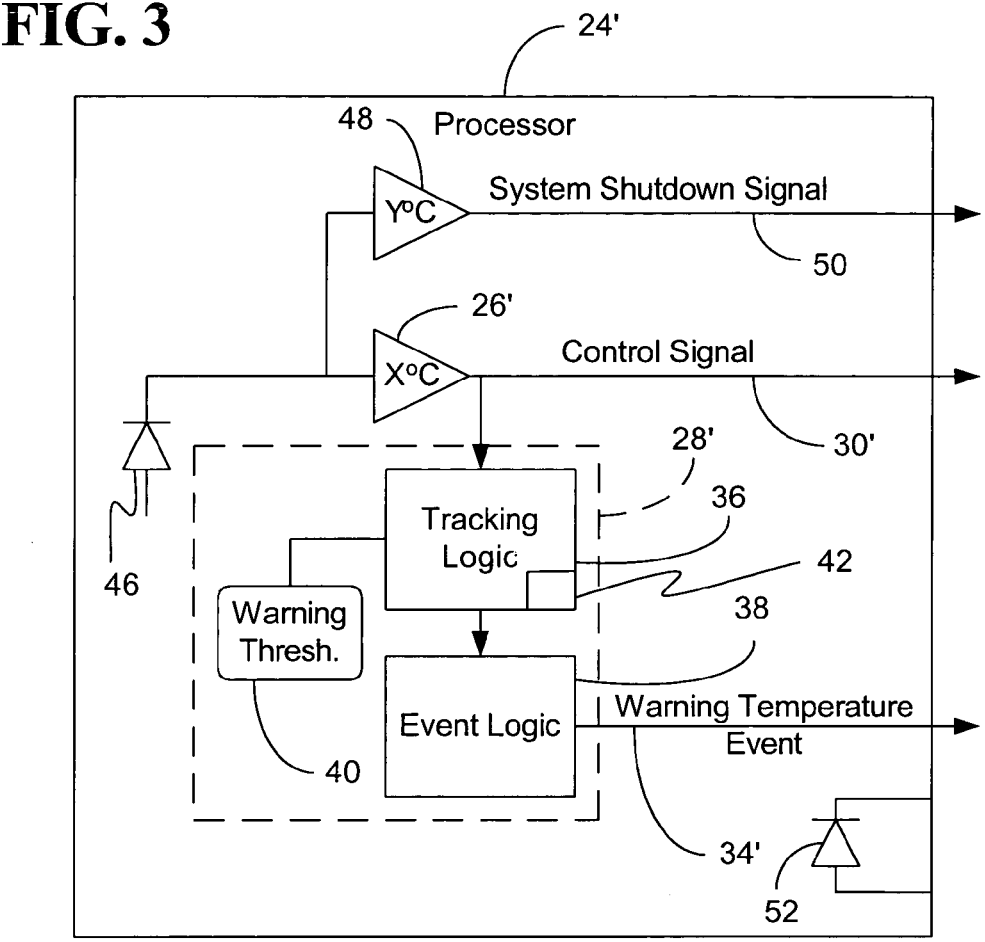
FIG. 3 is a block diagram of an example of a tracking module according to one embodiment of the invention.

Turning now to FIG. 3, a tracking module 28' of a processor 24' is shown in greater detail. In particular, the illustrated tracking module 28' has tracking logic 36 and event logic 38. The tracking logic 36 can use a counter 42 to track an activity level of the control signal 30', where the counter 42 indicates whether the activity level of the control signal has reached a warning threshold 40. If so, the event logic 38 generates the warning temperature event 34'.

Figure 4A:
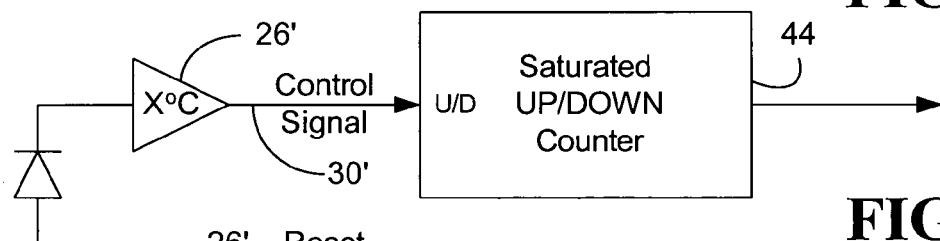
FIG. 4A is a block diagram of an example of a counter according to one embodiment of the invention.
Figure 4B:
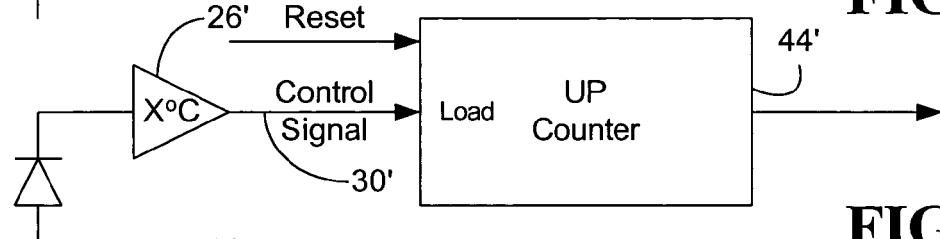
FIG. 4B is a block diagram of an example of a counter according to a first alternative embodiment of the invention.
Figure 4C:
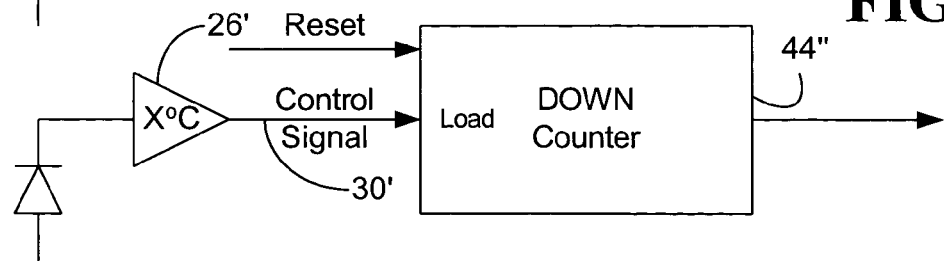
FIG. 4C is a block diagram of an example of a counter according to a second alternative embodiment of the invention.

FIGS. 4A-4C demonstrate various approaches to implementing the counter 42 (FIG. 3). For example, FIG. 4A shows a counter 44 that can be readily substituted for the counter 42 (FIG. 3), already discussed. The illustrated counter 44 is able to count either up or down depending upon the status of the control signal 30', and effectively integrates the control signal 30' over time. The counter 44 counts until it reaches either an upper or lower saturation point and can therefore be viewed as a "saturated" counter. In this embodiment, the counter 44 increases while the control signal 30' is active and decreases while the control signal 30' is inactive. Signal 30' will be active while the temperature decreases (thermal control is active) and inactive while the temperature increases. Heating and cooling is a symmetric behavior—for example, the rate at which the processor heats equals the rate at which the processor cools down. A duty cycle of fifty percent indicates that the temperature is stable. Thus, the duty cycle of the control signal 30' effectively determines whether a warning temperature event 34' (FIG. 3) will be generated.

If the thermal management is successful, the control signal 30' will be inactive more often than not (i.e., duty cycle <50%) and the counter 44 will count downward. If the thermal management is unsuccessful, however, the control signal 30' will be active more often than not (i.e., duty cycle >50%) and the counter will count upward toward the warning threshold 40 (FIG. 3). Such an approach provides a high level of sensitivity. It is also possible to create a skew such that the counter is increased by one but decreased by two, for example. This technique can provide for even greater tuning of the sensitivity of the thermal management mechanism. It should also be noted that other structures such as a shift register, finite state machine, etc., may be used to monitor the duty cycle of the control signal 30'.

Turning now to FIG. 4B, a counter 44' is shown in which the control signal 30' being active causes the counter 44' to count up, but the counter 44' does not count down. Rather, the counter 44' is reset to a value below the warning threshold 40 (FIG. 3) each time the internal temperature falls below the control temperature threshold. Provided the warning threshold 40 (FIG. 3) and the reset value are far enough apart, the counter 44' will only trigger the warning temperature event 34' in cases where the control signal 30' is continuously active. Such an approach may be used where a moderate level of sensitivity is acceptable. FIG. 4C shows a counter 44" that is similar to the counter 44' (FIG. 4B), already discussed, except that the counter 44" decreases while the control signal 30' is active and resets to a value above the warning threshold 40 (FIG. 3) each time the internal temperature falls below the control temperature threshold.

Returning now to FIG. 3, it can be seen that the illustrated processor 24' uses a comparator 26' as a control device, where the comparator 26' generates the control signal 30' based on an internal temperature measurement provided by a thermal diode 46. The biasing value of X° C. therefore represents the control temperature threshold, which is the lower threshold of the guard band. The processor 24' also includes a shutdown device such as comparator 48, which generates a system shutdown signal 50 if the internal temperature reaches a shutdown temperature threshold. The shutdown temperature threshold can be the upper threshold of the guard band and is shown as Y° C. in the illustrated embodiment. Thus, the size of the guard band for the processor 24' equals Y minus X. As already noted, the use of the highly accurate tracking module 28' enables the control temperature threshold to be increased, which reduces the size of the guard band. It should also be noted that the comparator 48 may in fact be removed, as the tracking module 28' could replace its functionality. Nevertheless, the temperature Y° C. still represents the highest allowable operation temperature.

The illustrated processor 24' can also include a secondary temperature measurement device such as a thermal diode 52, where the thermal diode 52 measures a secondary internal temperature of the processor 24'. The secondary internal temperature is reported as a voltage differential that defines an analog temperature, where the secondary temperature measurement device may be provided to accommodate legacy systems in which off-die temperature control is used. While the temperature measurement devices are shown as thermal diodes, other devices such as transistors, resistors, etc. may also be used depending upon the circumstances.

Figure 5:
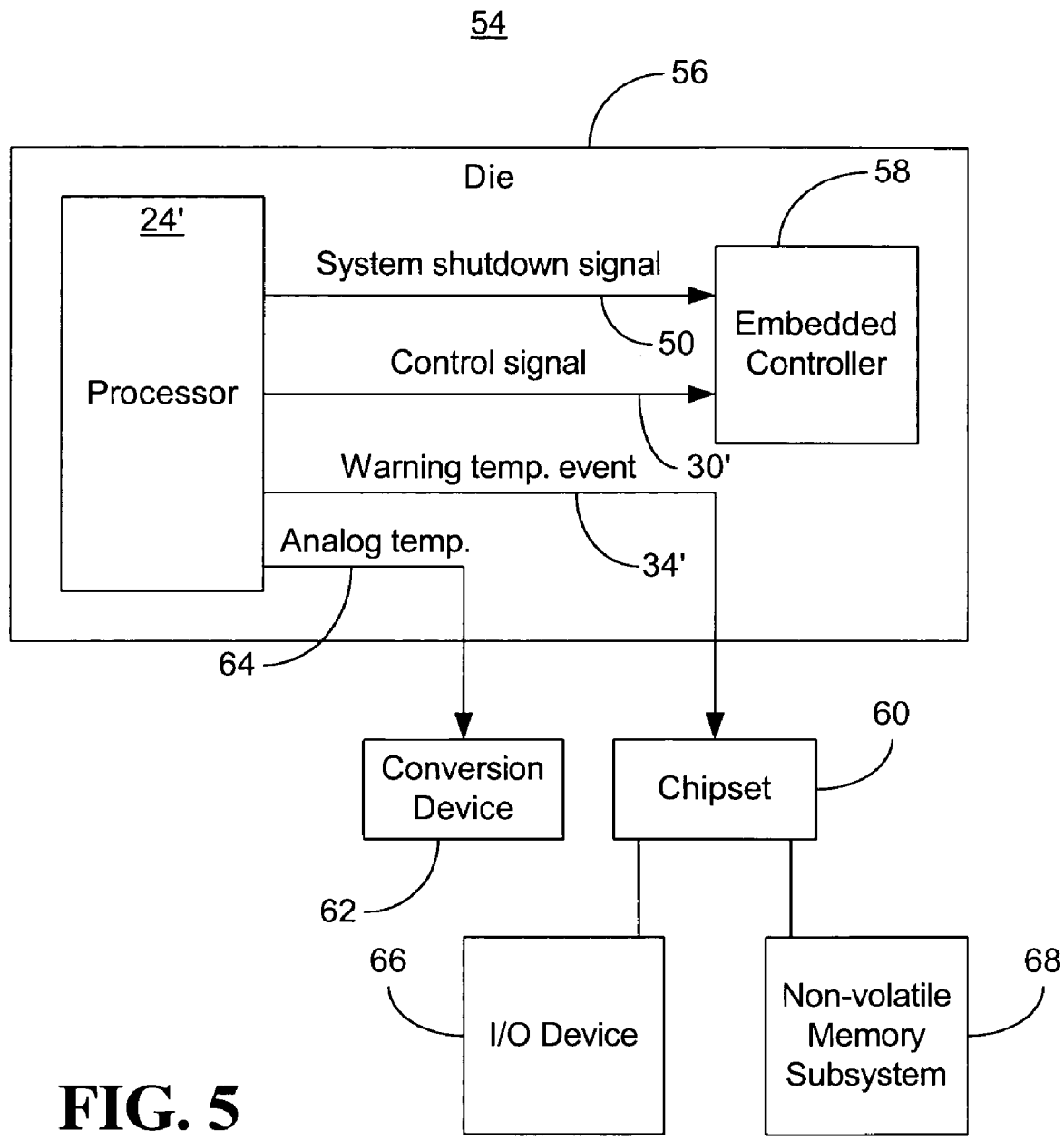
FIG. 5 is a block diagram of an example of a system according to one embodiment of the invention.

FIG. 5 shows a system 54 in which a semiconductor computer platform (PCB with several components) includes the processor 24' and an embedded controller 58. Some or all of the components may be integrated into a single integrated chip/die 56. The embedded controller 58 may be a complete system-on-chip (SOC). For example, the embedded controller 58 could include a central processing unit (CPU), local random access memory (RAM), local read only memory (ROM) or erasable programmable ROM (EPROM/Flash memory), clock and control circuits, and serial and parallel input/output (I/O) ports. The illustrated embedded controller 58 is able to receive the control signal 30' and conduct thermal management such as clock throttling and/or voltage/frequency scaling for the processor 24' in order to reduce the internal temperature of the processor 24'. Depending upon the particular system configuration, some or all of the thermal management may be incorporated into a chipset 60, which is also coupled to the processor 24'. In addition to thermal management, the illustrated embedded controller 58 can activate a system/processor shutdown in response to the system shutdown signal 50.

The embedded controller 58 can also perform the described tracking of the control signal 30' and perform a shutdown based on the duty cycle of the control signal 30'. For example, a tracking module 28 (FIG. 2) could be incorporated into the embedded controller 58 for this purpose. The system 54 also has a conversion device 62 coupled to the secondary temperature measurement device to convert the analog temperature (i.e., secondary internal temperature) 64 into a digital signal. The conversion device 62 can then provide the digital signal to other portions of the system 54 and/or issue its own interrupts.

The system 54 also has an input/output (I/O) device 66 and a non-volatile memory (NVM) subsystem 68 coupled to the processor 24' through the chipset 60. The NVM subsystem 68 includes a memory device such as magnetic disk ROM, compact disk ROM (CD-ROM), etc., and is able to retain data after power has been removed from the subsystem 68. In this regard, the NVM subsystem 68 could respond to the warning temperature event 34' by supporting an automated data saving process in which data in a volatile memory of the processor 24', embedded controller 58, or other component can be stored prior to system shutdown. Alternatively, the data could be written to a volatile memory (not shown) that operates on a different power source than the processor 34'. The warning temperature event 34' could also provide for a user notification that is transmitted to the I/O device 66 and recommends that a user of the system 54 initiate a manual data saving process. Such an approach might generate a message such as "Warning temperature shutdown pending—save all work." Furthermore, generating the warning temperature event could involve initiating an OS low power mode such as a sleep mode or a hibernate mode.

Figure 6:
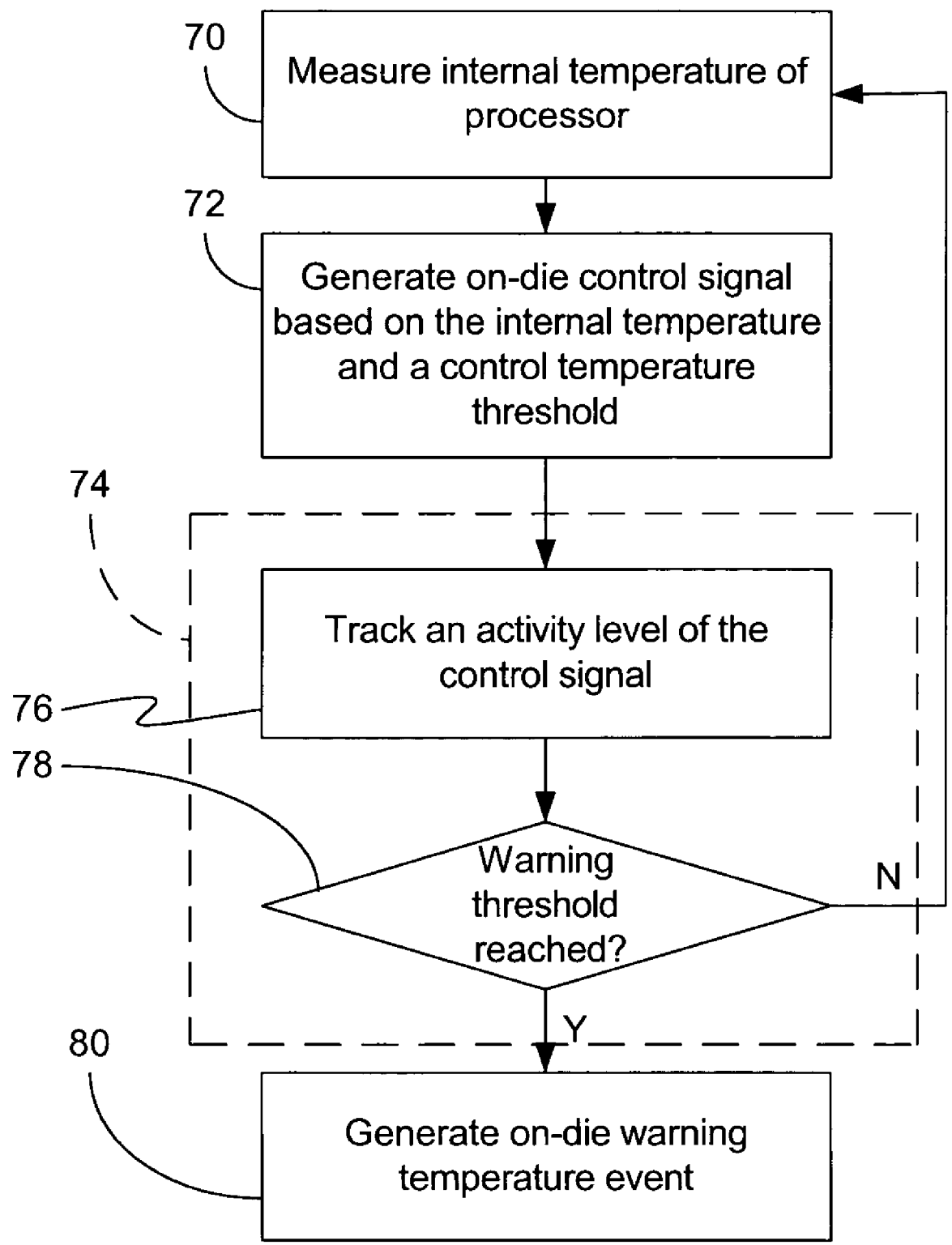
FIG. 6 is a flowchart of an example of a method according to one embodiment of the invention.

Turning now to FIG. 6, a method of managing on-die thermal protection is shown at 68. The method 68 may be implemented in a processor using any available hardware and/or software programming technique. For example, the method 68 can be incorporated into an application specific integrated circuit (ASIC) as transistor-transistor logic (TTL) or CMOS technology, into a set of instructions to be stored in a memory such as read only memory (ROM), compact disk ROM (CDROM), random access memory (RAM), flash memory, etc., or any combination thereof.

Processing block 70 provides for measuring an internal temperature of a processor and block 72 provides for generating a control signal on a die containing the processor. The control signal is generated based on the internal temperature and a control temperature threshold. Block 74 generally provides for determining whether to generate a warning temperature event on the die based on a behavior of the control signal. In particular, the illustrated example provides for tracking an activity level of the control signal at block 76. If it is determined at block 78 that the activity level of the control signal has reached a warning threshold, block 80 provides for generating the warning temperature event. Otherwise, the method 68 returns to block 70 for continued measurement of the internal temperature of the processor.

Figure 7A:
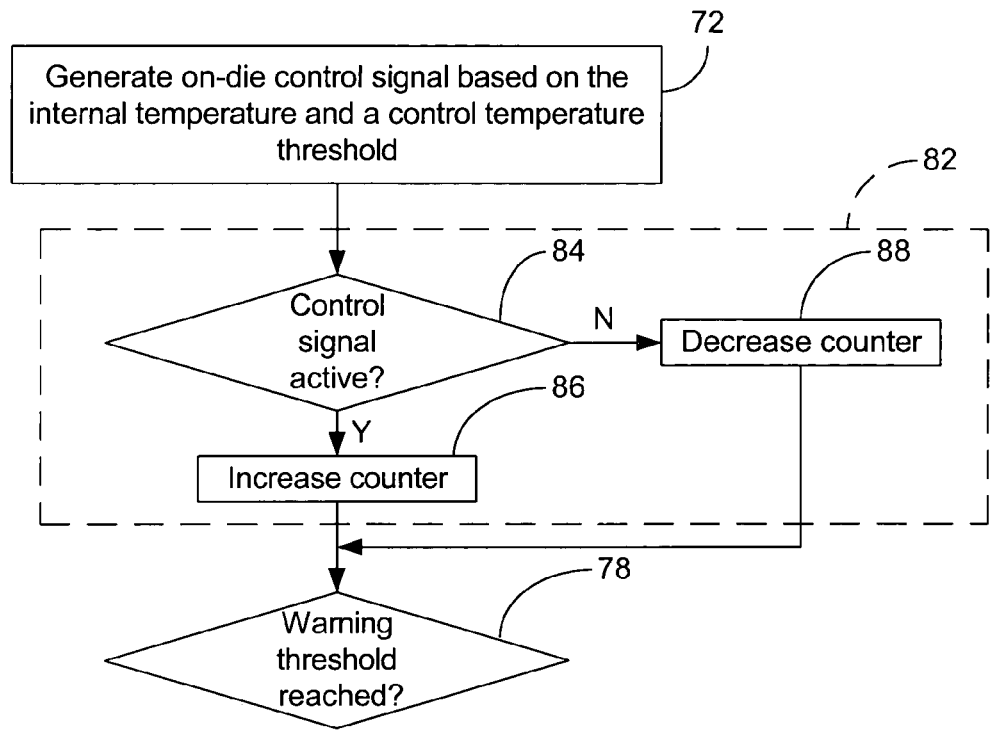
FIG. 7A is a flowchart of an example of a process of tracking an activity level of a control signal according to one embodiment of the invention.

FIG. 7A shows one approach to tracking an activity level of a control signal in greater detail at 82. Block 82 can therefore be readily substituted for block 76 (FIG. 6) discussed above. In the illustrated example, block 84 provides for determining whether the control signal is active. If so, a counter is increased at block 86. Otherwise, the counter is decreased at block 88. Thus, the illustrated approach could use a counter such as the saturated up/down counter 44 (FIG. 4A) already discussed. Accordingly, block 82 provides for high accuracy tracking of the control signal.

Figure 7B:
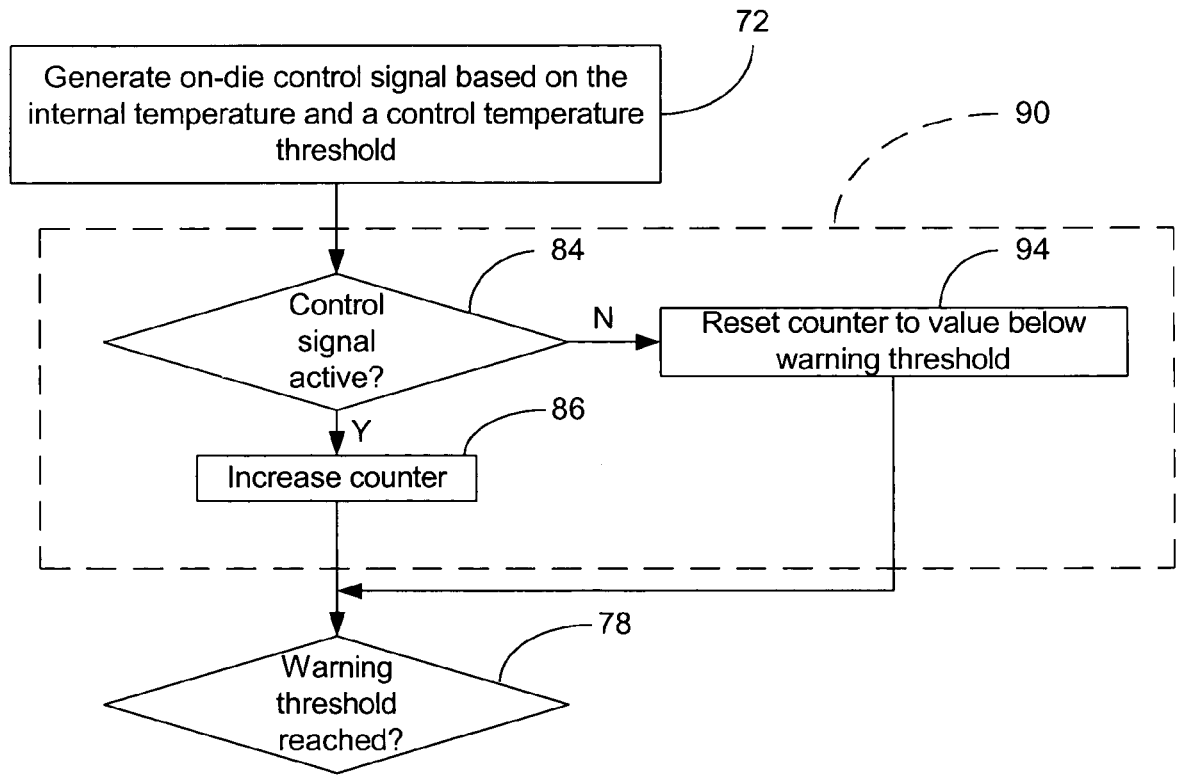
FIG. 7B is a flowchart of an example of a process of tracking an activity level of a control signal according to a first alternative embodiment of the invention.

Turning now to FIG. 7B, another approach to tracking an activity level of a control signal is shown at block 90, which can also be substituted for block 76 (FIG. 6) discussed above. In this approach, if it is determined at block 84 that the control signal is inactive, the counter is reset to a value below the warning threshold at block 94. If the control signal is active, the counter is increased at block 86. Thus, this example could use the counter 44' (FIG. 4B), which only counts up. By resetting the counter each time the internal temperature falls below the control temperature threshold, the illustrated embodiment provides for an approach that is somewhat less sensitive than the embodiment illustrated in FIG. 7A.

Figure 7C:
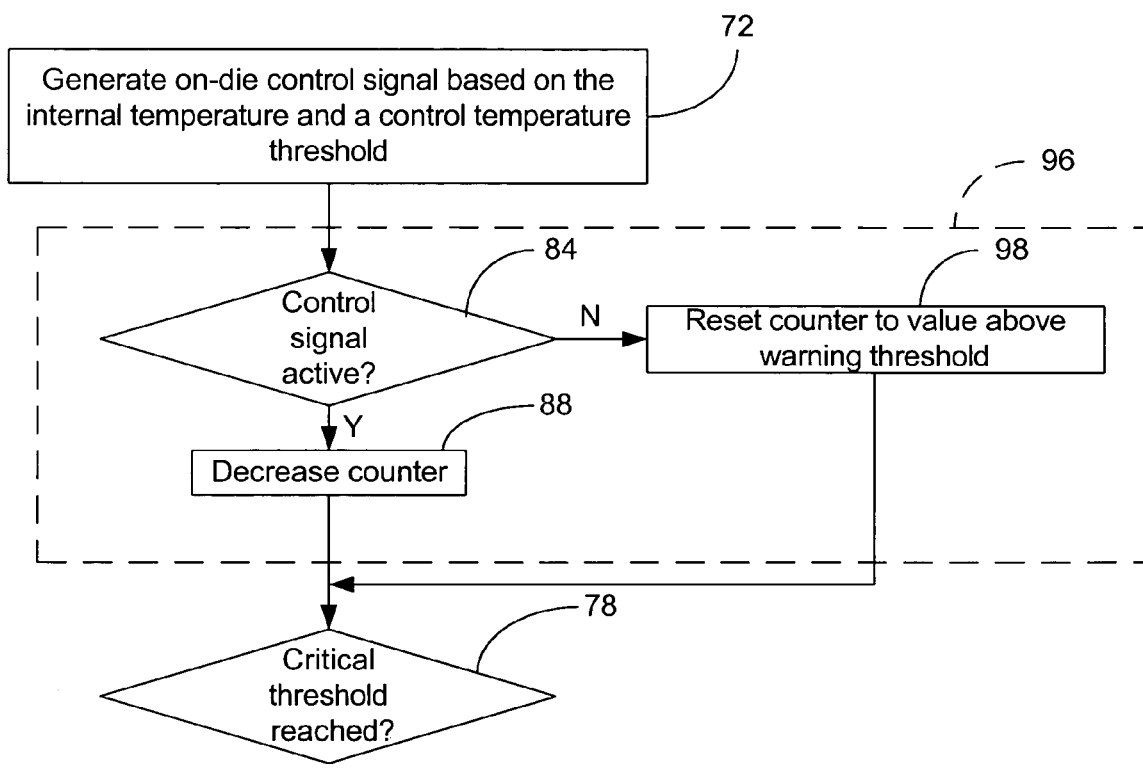
FIG. 7C is a flowchart of an example of a process of tracking an activity level of a control signal according to a second alternative embodiment of the invention.

FIG. 7C shows yet another approach to tracking a control signal at block 96, and block 96 can be readily substituted for block 76 (FIG. 6) discussed above. The illustrated embodiment is similar to the approach shown in block 90 (FIG. 7B), except that the counter counts down instead of up. Thus, if it is determined at block 84 that the control signal is inactive, block 98 provides for resetting the counter to a value above the warning threshold. Whenever the control signal is active, the counter is decreased at block 88.

Those skilled in the art can appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A method comprising:
    receiving a continuous analog signal representing an internal temperature for a processor by a comparator from a temperature measuring device, the comparator and the temperature measuring device disposed on a semiconductor die with the processor;
    comparing the continuous analog signal with a control temperature threshold;
    generating a control signal with a duty cycle based on the comparison;
    tracking an activity level of the control signal based on the duty cycle; and
    generating a warning temperature event when the activity level of the control signal reaches a warning threshold.

2. The method of claim 1, wherein the tracking includes:
    increasing a counter if the control signal is active; and
    decreasing the counter if the control signal is inactive, the counter indicating whether the activity level of the control signal has reached the warning threshold.

3. The method of claim 1, wherein the tracking includes:
    increasing a counter if the control signal is active; and
    resetting the counter to a value below the warning threshold if the internal temperature falls below the control temperature threshold, the counter indicating whether the activity level of the control signal has reached the warning threshold.

4. The method of claim 1, wherein the tracking includes:
    decreasing a counter if the control signal is active; and
    resetting the counter to a value above the warning threshold if the internal temperature falls below the control temperature threshold, the counter indicating whether the activity level of the control signal has reached the warning threshold.

5. The method of claim 1, wherein the tracking includes tracking the control signal with a finite state machine.

6. The method of claim 1, wherein generating the warning temperature event includes generating a user notification, the user notification including a recommendation to initiate a manual data saving process.

7. The method of claim 1, wherein generating the warning temperature event includes initiating a process selected from a group comprising an automated data saving process, an operating system procedure, a system management software routine and a platform control function.

8. The method of claim 1, further including generating a system shutdown signal on the die if the internal temperature reaches a shutdown temperature threshold.

9. The method of claim 1, further including measuring a secondary internal temperature of the processor.

10. An apparatus comprising:
a temperature measuring device disposed on a die with a processor, the temperature measuring device operative to output a continuous analog signal representing an internal temperature for a processor;
a comparator on the die to couple to the temperature measuring device, the comparator operative to receive the continuous analog signal, compare the continuous analog signal with a control temperature threshold, and generate a control signal with a duty cycle based on the comparison; and
a tracking module on the die to couple to the comparator, the tracking module including tracking logic operative to track an activity level of the control signal based on the duty cycle, and event logic operative to generate a warning temperature event when the activity level of the control signal reaches a warning threshold.

11. The apparatus of claim 10, wherein the tracking logic includes a counter to indicate whether the activity level of the control signal has reached the warning threshold, the counter to increase if the control signal is active and decrease if the control signal is inactive.

12. The apparatus of claim 10, wherein the tracking logic includes a counter to indicate whether the activity level of the control signal has reached the warning threshold, the counter to increase if the control signal is active and reset to a value below the warning threshold if the internal temperature falls below the control temperature threshold.

13. The apparatus of claim 10, wherein the tracking logic includes a counter to indicate whether the activity level of the control signal has reached the warning threshold, the counter to decrease if the control signal is active and reset to a value above the warning threshold if the internal temperature falls below the control temperature threshold.

14. The apparatus of claim 10, wherein the tracking logic includes a finite state machine to track the activity level of the control signal.

15. The apparatus of claim 10, wherein the warning temperature event is to include a user notification that includes a recommendation to initiate a manual data saving process.

16. The apparatus of claim 10 wherein the warning temperature event is to include an initiation of a process selected from a group comprising an automated data saving process, an operating system procedure, a system management software routine and a platform control function.

17. The apparatus of claim 10, further including a shutdown device to generate a system shutdown signal if the internal temperature reaches a shutdown temperature threshold.

18. The apparatus of claim 10, further including a secondary temperature measurement device to measure a secondary internal temperature of the processor.

19. A system comprising:
a temperature measuring device disposed on a semiconductor die with a processor, the temperature measuring device operative to output a continuous analog signal representing an internal temperature for a processor;
a comparator on the die to couple to the temperature measuring device, the comparator operative to receive the continuous analog signal, compare the continuous analog signal with a control temperature threshold, and generate a control signal with a duty cycle based on the comparison;
a tracking module on the die to couple to the comparator, the tracking module including tracking logic operative to track an activity level of the control signal based on the duty cycle, and event logic operative to generate a warning temperature event when the activity level of the control signal reaches a warning threshold; and
a non-volatile memory subsystem coupled to the semiconductor die to support an automated data saving process in response to the warning temperature event, wherein the internal temperature is measured using a temperature measuring device.

20. The system of claim 19, wherein the processor further includes a shutdown device to generate a system shutdown signal if the internal temperature reaches a shutdown temperature threshold.

21. The system of claim 20, wherein the die further includes an embedded controller coupled to the processor to conduct thermal management for the processor in response to the control signal and the system shutdown signal.

22. The system of claim 19, wherein the processor further includes a secondary temperature measurement device to measure a secondary internal temperature of the processor.

23. The system of claim 22, further including a conversion device coupled to the secondary temperature measurement device to convert the secondary internal temperature into a digital signal.

24. The system of claim 19, further including a chipset disposed between the semiconductor package and the memory subsystem.

25. A method comprising:
receiving a continuous analog signal representing an internal temperature for a processor by a comparator from a thermal diode, the comparator and the thermal diode integrated on a semiconductor die with the processor;
comparing the continuous analog signal with a control temperature threshold;
generating a control signal with a duty cycle based on the comparison;
tracking an activity level of the control signal based on the duty cycle;
generating a warning temperature event when the activity level of the control signal reaches a warning threshold, the generating of the warning temperature event including at least one of initiating an automated data saving process and generating a user notification, the user notification including a recommendation to initiate a manual data saving process.

26. The method of claim 25, further including:
generating a system shutdown signal on the die if the internal temperature reaches a shutdown temperature threshold; and
powering down the processor in response to the system shutdown signal.

27. The method of claim 25, wherein generating the warning temperature event further includes initiating an operating system low power mode.

28. The method of claim 25, further including measuring a secondary internal temperature of the processor.

29. The method of claim 25, wherein the tracking includes tracking the activity level with a skewed counter.

* * * * *

UNITED STATES PATENT AND TRADEMARK OFFICE
CERTIFICATE OF CORRECTION

PATENT NO. : 7,656,635 B2  
APPLICATION NO. : 10/912977  
DATED : February 2, 2010  
INVENTOR(S) : Efraim Rotem Page 1 of 1

It is certified that error appears in the above-identified patent and that said Letters Patent is hereby corrected as shown below:

In column 7, line 49, in Claim 16, after "claim 10" insert -- , --.

Signed and Sealed this

Thirtieth Day of March, 2010

David J. Kappos  
*Director of the United States Patent and Trademark Office*